United States Patent
Leman

(10) Patent No.: US 6,266,234 B1
(45) Date of Patent: Jul. 24, 2001

(54) EXPANDABLE COMPUTER KEYBOARD

(75) Inventor: Michael Leman, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/105,760

(22) Filed: Jun. 26, 1998

(51) Int. Cl.[7] .............................. G06F 3/023; H05K 5/02
(52) U.S. Cl. .................... 361/680; 361/683; 361/681; 364/708.1; 341/22; 312/208.4; 348/168
(58) Field of Search ...................... 361/682, 680, 361/683, 681, 686, 724–727; 364/708.1, 709.12; 400/489, 715; 341/21, 22; 248/118, 118.1, 118.3, 118.5; D14/115, 247; D18/1, 7, 52; 345/168, 169

(56) References Cited

U.S. PATENT DOCUMENTS

| | | | |
|---|---|---|---|
| D. 306,433 | 3/1990 | Mitchell | D14/106 |
| 3,940,758 | 2/1976 | Margolin | 340/337 |
| 4,333,155 * | 6/1982 | Johnston . | |
| 4,378,553 | 3/1983 | McCall | 340/365 R |
| 4,509,873 | 4/1985 | Ryan | 400/489 |
| 4,517,660 | 5/1985 | Fushimoto et al. | 364/708 |
| 4,661,005 | 4/1987 | Lahr | 400/489 |
| 4,739,451 | 4/1988 | Kuba | 361/394 |
| 4,839,837 | 6/1989 | Chang | 364/708 |
| 4,852,498 | 8/1989 | Judd | 108/43 |
| 5,067,834 | 11/1991 | Szmanda et al. | 400/489 |
| 5,073,050 | 12/1991 | Andrews | 400/82 |
| 5,137,384 | 8/1992 | Spencer et al. | 400/489 |
| 5,150,118 * | 9/1992 | Finkle et al. . | |
| 5,187,644 | 2/1993 | Crisan | 361/393 |
| 5,228,791 | 7/1993 | Fort | 400/489 |
| 5,251,106 * | 10/1993 | Hui . | |
| 5,336,002 * | 8/1994 | Russo . | |
| 5,410,333 * | 4/1995 | Conway . | |
| 5,424,728 * | 6/1995 | Goldstein | 341/22 |
| 5,457,453 | 10/1995 | Chiu et al. | 341/22 |
| 5,502,460 | 3/1996 | Bowen | 345/168 |
| 5,519,569 | 5/1996 | Sellers | 361/680 |
| 5,574,481 * | 11/1996 | Lee | 345/168 |
| 5,616,897 * | 4/1997 | Weber et al. | 200/5 A |
| 5,644,338 | 7/1997 | Bowen | 345/168 |
| 5,653,543 * | 8/1997 | Abe | 400/489 |
| 5,687,058 * | 11/1997 | Roylance . | |
| 5,703,578 * | 12/1997 | Allison | 341/22 |
| 5,712,760 * | 1/1998 | Coulon et al. | 361/680 |
| 5,865,546 * | 2/1999 | Ganthier et al. . | |
| 5,983,073 * | 11/1999 | Ditzik . | |
| 5,995,025 * | 11/1999 | Sternglass et al. | 341/22 |
| 6,025,986 * | 2/2000 | Sternglass et al. | 361/680 |

FOREIGN PATENT DOCUMENTS

| | | | |
|---|---|---|---|
| 3-17723 * | 1/1991 | (JP) | G06F/3/02 |
| 5-19925 * | 7/1991 | (JP) | G06F/3/02 |
| 6-337733 * | 5/1993 | (JP) | G06F/1/16 |
| 6-149416 * | 5/1994 | (JP) | G06F/1/16 |

OTHER PUBLICATIONS

RCA Remote Model No. RTB100, Top Isometric View.
RCA Remote Model No. RTB100, Bottom Isometric View.
Sony Playstation, Top Isometric View.
Sejin Eletron Inc., SWK–5697WT, Top Isometric View.
Sejin Electron Inc., SWk–5697Wt, Bottom Isometric View.

* cited by examiner

*Primary Examiner*—Leo P. Picard
*Assistant Examiner*—Anatoly Vortman
(74) *Attorney, Agent, or Firm*—Perkins Coie LLP

(57) ABSTRACT

A keyboard for a hand-held computer. In one embodiment, the keyboard includes first and second portions that are removably coupled to each other. The second portion can be removably coupled to one part of the first portion to block access to input keys of the first portion, and can be removably attached to another part of the first portion to allow access to the input keys, forming a full-size keyboard for a hand-held device. The second portion can be reversible to allow access to input keys on either a top or bottom surface of the second portion, and can also be pivotable relative to the first portion about an axis that is generally perpendicular to an upper surface of the first portion.

54 Claims, 10 Drawing Sheets

EXPANDABLE COMPUTER KEYBOARD

TECHNICAL FIELD

The present invention is directed to an expandable keyboard for use with computers, such as hand-held computers.

BACKGROUND OF THE INVENTION

Hand-held computers are relatively small personal computers that can fit in the palm of a user's hand. Conventional hand-held computers may include a display that is pivotally connected to a housing containing a processor and a keyboard. The display may be folded toward the keyboard in a stowed configuration when the computer is not in use, and the display may be pivoted away from the keyboard to allow access to both the keyboard and the display when the computer in use. The keyboard may include alphanumeric input keys and function keys that may be depressed in a conventional manner to send signals to the processor and to move images on the display.

One drawback with conventional keyboards for hand-held computers is that the input keys may be quite small and closely spaced, making the keyboard difficult to use. One conventional approach for addressing this problem has been to add folding flaps to the keyboard to provide more space for the input keys. For example, U.S. Pat. No. 5,187,644 to Crisan and U.S. Pat. No. 5,519,569 to Sellers each disclose a laptop-size computer keyboard having a central portion with two movable flaps. Each flap is pivotally connected to one edge of the central portion. Users fold the flaps over the central portion when the keyboard is not in use, and unfold the flaps away from the central position to access input keys on both the central portion and the exposed surfaces of the flaps. U.S. Pat. No. 5,519,569 further discloses scissored linkage arm assemblies that extend the input keys for operation and retract the input keys for storage.

One problem with the folding keyboards disclosed in U.S. Pat. Nos. 5,187,644 and 5,519,569 is that the flaps must be unfolded to access the input keys. Accordingly, the keyboards may not be easy to use in cramped environments where it is difficult or impossible to unfold the flaps. Another problem is that the input keys on the flaps may only be accessed when the flaps are in one position, i.e., the unfolded position. Accordingly, the keyboards may not be suitable or comfortable for users who may prefer to access the input keys when the flaps are in other, more comfortable positions. In fact, because the flaps must be unfolded to operate these computers, it may not be possible to use these computers in highly cramped environments in which the flaps cannot be adequately opened.

One approach to addressing some of the problems with folding keyboards has been to position input keys on both a top surface and a bottom surface of one of the flaps so that one set of input keys is accessible when the flap is folded and another set of input keys is accessible when the flap is unfolded. For example, U.S. Pat. No. 3,940,758 to Margolin discloses a calculator having three keyboard portions, including an upper portion, an intermediate portion, and a lower portion. Each of the keyboard portions is folded upon the other in a folded configuration and unfolded from the others in an unfolded configuration. Input keys on the top surface of the upper portion are accessible in the folded configuration, and input keys on the bottom surface of the upper portion are accessible in the unfolded configuration. A drawback with this approach is that it allows the user to access the input keys of the upper portion when the upper portion is in only two configurations, i.e., the folded configuration or the unfolded configuration, but does not allow the user to adjust the keyboard in either configuration. As discussed above, users may prefer to access the input keys when the upper portion is in any one of a variety of positions. Another problem is that each of the three portions, including the upper portion, is relatively small and may have space for only a limited number of input keys. Accordingly, when the keyboard is in the folded configuration, only a limited number of input keys are accessible.

SUMMARY OF THE INVENTION

The present invention is directed toward keyboards for use with hand-held computers. In one embodiment, a keyboard includes a first or base portion having a first plurality of input keys, and a second or upper portion having a second plurality of input keys. The upper portion can be movable relative to the base portion between a first or stacked position and a second or unstacked position. In the stacked position, the upper portion can be removably attached to the base portion to block access to the first plurality of input keys. In the unstacked position, the upper portion can be at least proximate to the base portion, with the first and second pluralities of input keys being generally accessible. For example, the upper portion can be spaced apart from the base portion when it is in the unstacked position, or the upper portion can be attached to one side of the base portion when it is in the unstacked position. In either case, the first and second pluralities of input keys can together define a full-sized QWERTY keyboard configuration. The upper portion can also be reversible and can have one set of input keys that are accessible when the upper portion is in the stacked position, and a different set of input keys that are accessible when the upper portion is in the unstacked position.

In another embodiment, the upper portion of the keyboard can be pivotably coupled to the base portion of the keyboard to pivot relative to the base portion about a pivot axis that is generally perpendicular to an upper surface of the base portion. The hinge may be integrally connected with the base portion, or the hinge may be removably coupled between the base and upper portions.

In yet another embodiment, the base portion has an upper surface, first and second opposite edges adjacent the upper surface, and base input keys at least proximate to the upper surface. The keyboard can include first and second flap portions pivotably coupled to the base portion and pivotable relative to the base portion between a folded position and an unfolded position. The first and second flap portions block the base input keys when they are in the folded position, or they expose the base input keys when they are in the unfolded position. The flap portions may include top input keys that are exposed when the flap portions are in the folded configuration, and bottom input keys that are exposed when flap portions are in the unfolded configuration.

DETAILED DESCRIPTION OF THE INVENTION

The present invention is directed toward keyboards for computers, such as hand-held computers. In one embodiment, a keyboard may include an upper portion that can be stacked on a base portion in one position or attached to a side of the base portion in another position. The upper portion can have input keys on both a top and bottom surface. Many specific details of certain embodiments of the invention are set forth in the following description and in FIGS. 1–9 to provide a thorough understanding of such embodiments. One skilled in the art, however, will understand that the present invention may have additional embodiments that may be practiced without several of the details described in the following description.

Figure 1:
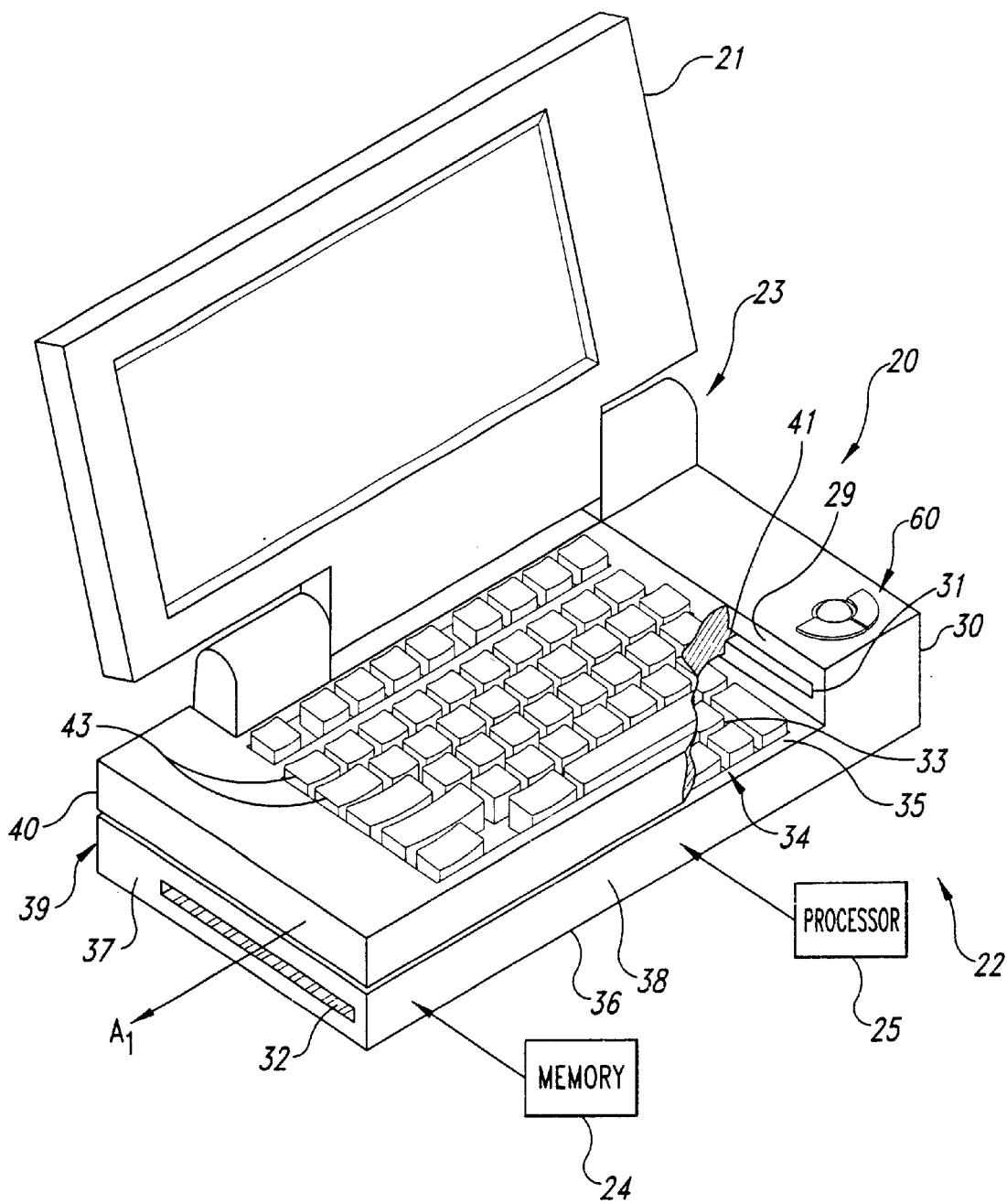
FIG. 1 is a cut-away top isometric view partially illustrating a hand-held computer having a keyboard with a removable upper portion positioned on a base portion in accordance with one embodiment of the invention.

FIG. 1 is a cut-away top isometric view partially illustrating a hand-held computer 20 in accordance with an embodiment of the invention. In the particular embodiment shown in FIG. 1, the hand-held computer 20 has a display 21 connected to a keyboard 22 with a pivot joint 23. The display 21 is movable relative to the keyboard 22 between an unstowed configuration (shown in FIG. 1) and a stowed configuration in which the display 21 is folded against the keyboard 22 (not shown). In its stowed configuration, the hand-held computer 20 can have a width in the range of approximately two inches to approximately ten inches (preferably about seven inches), a depth in the range of approximately two inches to approximately eight inches (preferably about four inches), and a height in the range of approximately one-half inch to approximately two inches (preferably about one inch), so as to be easily held in a user's hand in either the stowed or unstowed configurations.

The keyboard 22 can include a pointing device 60, for example, a roller ball (shown in FIG. 1), a touch pad, a joystick or other device for moving or otherwise manipulating images on the display 21; the keyboard can also include a memory 24 and processor 25, both shown schematically in FIG. 1. The keyboard 22 can further include a base portion 30 having right input keys 33, and an upper portion 40 having left input keys 43. The upper portion 40 can be removably attached to the base portion 30 at a first attachment site 31 in a stacked configuration (shown in FIG. 1), or the upper portion 40 can be removably attached to a second attachment site 32 of the base portion 30 in an unstacked configuration (discussed in greater detail below with reference to FIG. 2).

The base portion 30 can have an upper surface 35, a lower surface 36 opposite the upper surface, front and rear surfaces 38 and 39 between the upper and lower surfaces, and a side surface 37 between the front and rear surfaces. The right input keys 33 project through a key aperture 34 in the upper surface 35. The right input keys 33 can be arranged to form the right portion of a standard QWERTY keyboard configuration, and alternatively, can further include number keys and/or function keys. The left input keys 43 can be arranged to form the left portion of a standard QWERTY keyboard configuration. Both the right input keys 33 and the left input keys 43 are generally sized, spaced, constructed, and operated similarly to the input keys of a conventional desktop computer keyboard. The right and left input keys 33 and 43, however, may have other configurations and sizes according to the particular application.

The upper surface 35 of the base portion 30 can be recessed in the region of the right input keys 33 to receive the upper portion 40 when the keyboard 22 is in the stacked configuration and attached to the first attachment site 31. Accordingly, the first attachment site 31 can be located in a side-facing surface 29 of the recess adjacent the right input keys 33. In one embodiment, the first attachment site 31 includes a port or aperture configured to receive a corresponding tab 41 of the upper keyboard portion 40. In one variation of this embodiment, the first attachment site 31 does not include electrical contacts, and accordingly, the left input keys 43 of the upper portion 40 are inactive when the upper portion 40 is stacked on the base portion 30 and attached to the first attachment site 31. In another variation, the first attachment site 31 and the tab 41 have corresponding electrical connectors to electrically couple the upper portion 40 to the base portion 30, as will be discussed in greater detail below with reference to FIG. 5. In either case, the upper portion 40 blocks access to the right input keys 33 when the upper portion is attached to the first attachment site 31 in the stacked configuration.

Figure 2:
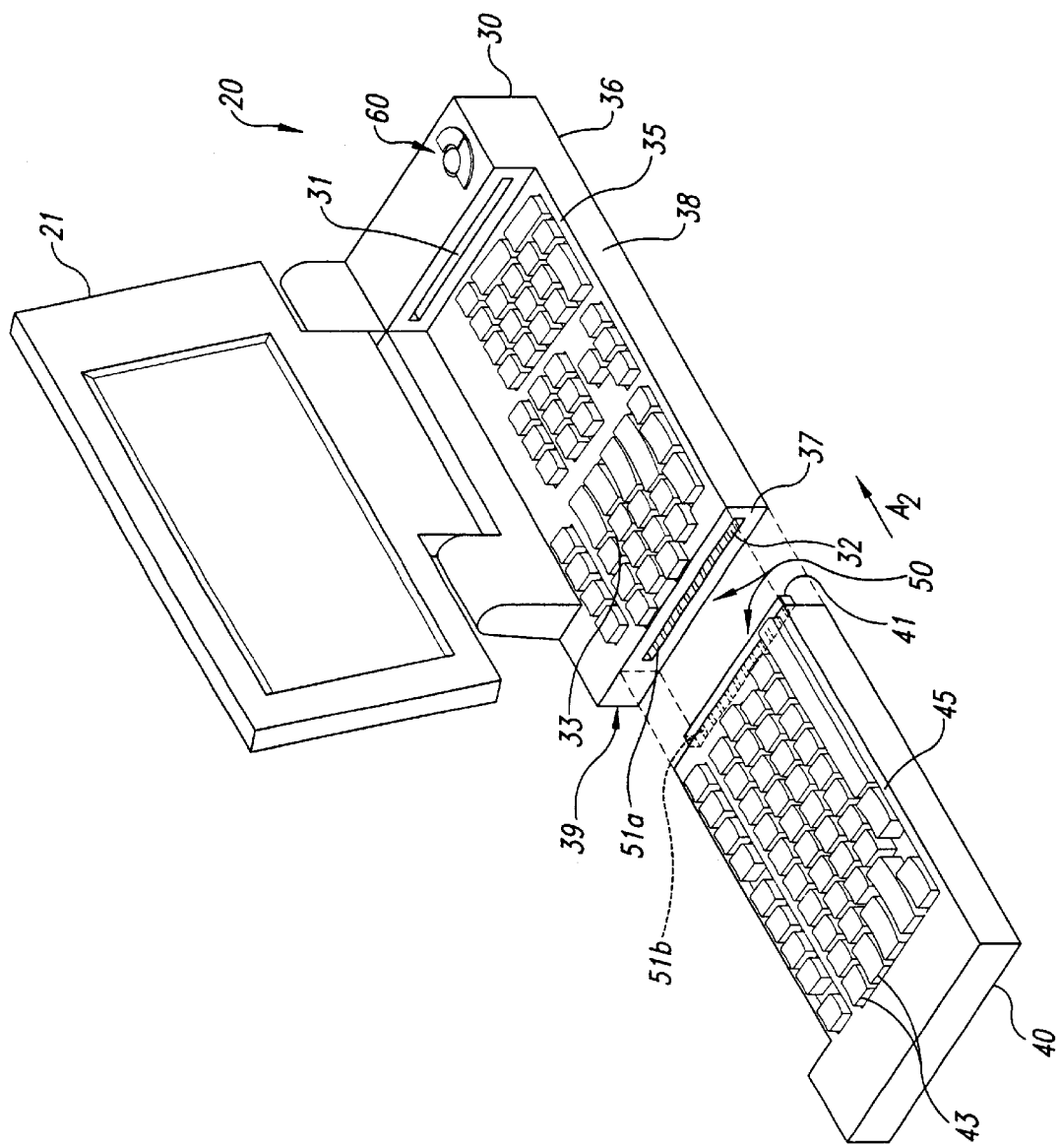
FIG. 2 is a top isometric view of the keyboard of FIG. 1 with the upper portion of the keyboard positioned alongside the base portion.

FIG. 2 is an exploded top isometric view of the hand-held computer 20 of FIG. 1 shown in an unstacked configuration in which the upper portion 40 is adjacent to the second attachment site 32 of the base portion 30. As shown in FIG. 2, the second attachment site 32 can be located in the side surface 37 of the base portion 30. The second attachment site 32 can include a port or aperture configured to receive the tab 41 of the upper portion 40 for joining the upper portion 40 to the base portion 30 in a side-by-side arrangement. When the upper portion 40 and lower portion 30 are in the side-by-side arrangement, a top surface 45 of the upper portion 40 is generally co-planer with the upper surface 35 of the base portion 30. The second attachment site 32 can be configured to receive and grip the tab 41 for preventing the upper portion 40 from inadvertently being detached from the second attachment site 32 of base portion 30.

The upper portion 40 can be operatively coupled to the base portion 30 by many different devices. In one embodiment, both the second attachment site 32 and the tab 41 may include electrical contacts 51 (shown as 51a and 51b) that together form a communication link 50 for transmitting electrical signals between the upper portion 40 and the base portion 30. For example, the tab 41 and the second connection site 32 may include a conventional connector and socket, respectively. Alternatively, the computer 20 can include other devices that operatively and/or physically couple the upper portion 40 to the base portion 30. For example, the computer 20 may include electrical connectors other than the type shown in FIG. 2, and/or the computer 20 may include a locking mechanism that releasably locks the upper portion 40 to the lower portion 30 when the upper portion is attached to the first and/or second attachment sites 31 and 32.

Operation of an embodiment of the hand-held computer 20 is best understood with reference to FIGS. 1 and 2. Referring first to FIG. 1, a user can move the display 21 to its unstowed configuration by pivoting the display away from the keyboard 22. The user can then disengage the upper portion 40 from the first attachment site 31 by sliding the upper portion 40 laterally away from the first attachment site (arrow $A_1$). Referring now to FIG. 2, the user can then position the upper portion 40 next to the base portion 30 and couple the upper portion to the base portion by sliding the upper portion 40 until the tab 41 is received by the second attachment site 32 (arrow $A_2$). The right and left input keys 33 and 43 together form a standard QWERTY key configuration that can be operated in a conventional manner. The user can operate the keyboard 22 by placing the keyboard on a flat surface, such as a desktop. Alternatively, each of the keyboard portions 30 and 40 may be wide enough to extend over one of the user's legs and users can accordingly support the keyboard 22 on their laps.

One advantage of an embodiment of the hand-held computer 20 shown in FIGS. 1 and 2 is that it may be easier for users accustomed to operating full-sized keyboards to operate the expandable keyboard 22. Because the size and spacing of the input keys 33 and 43 is similar to the size and spacing of the input keys of conventional desktop keyboards, users who are used to conventional desktop keyboards may easily use the hand-held computer 20 without adjusting their hand positions and/or their keystrokes.

Another advantage of the hand-held computer 20 shown in FIGS. 1 and 2 is that it may be more comfortable to operate. For example, the input keys 33 and 43 can be large enough and spaced far enough apart to be easily accessed by users, unlike the input keys of conventional hand-held computers. Still another advantage is that the hand-held computer 20 may include fewer moving parts than conventional expandable computer keyboards. For example, some conventional expandable keyboards may include pivotable linkages between portions of the keyboard, and the input keys themselves may collapse and expand in a manner that requires additional complex mechanisms. By contrast, the upper portion 40 of the hand-held computer 20 shown in FIGS. 1 and 2 is easily removable from and reattachable to the base portion 30 using conventional, fixed connectors or other relatively simple devices. Furthermore, the input keys 33 and 43 are similar in construction and operation to the input keys of standard desktop computer keyboards.

Figure 3A:
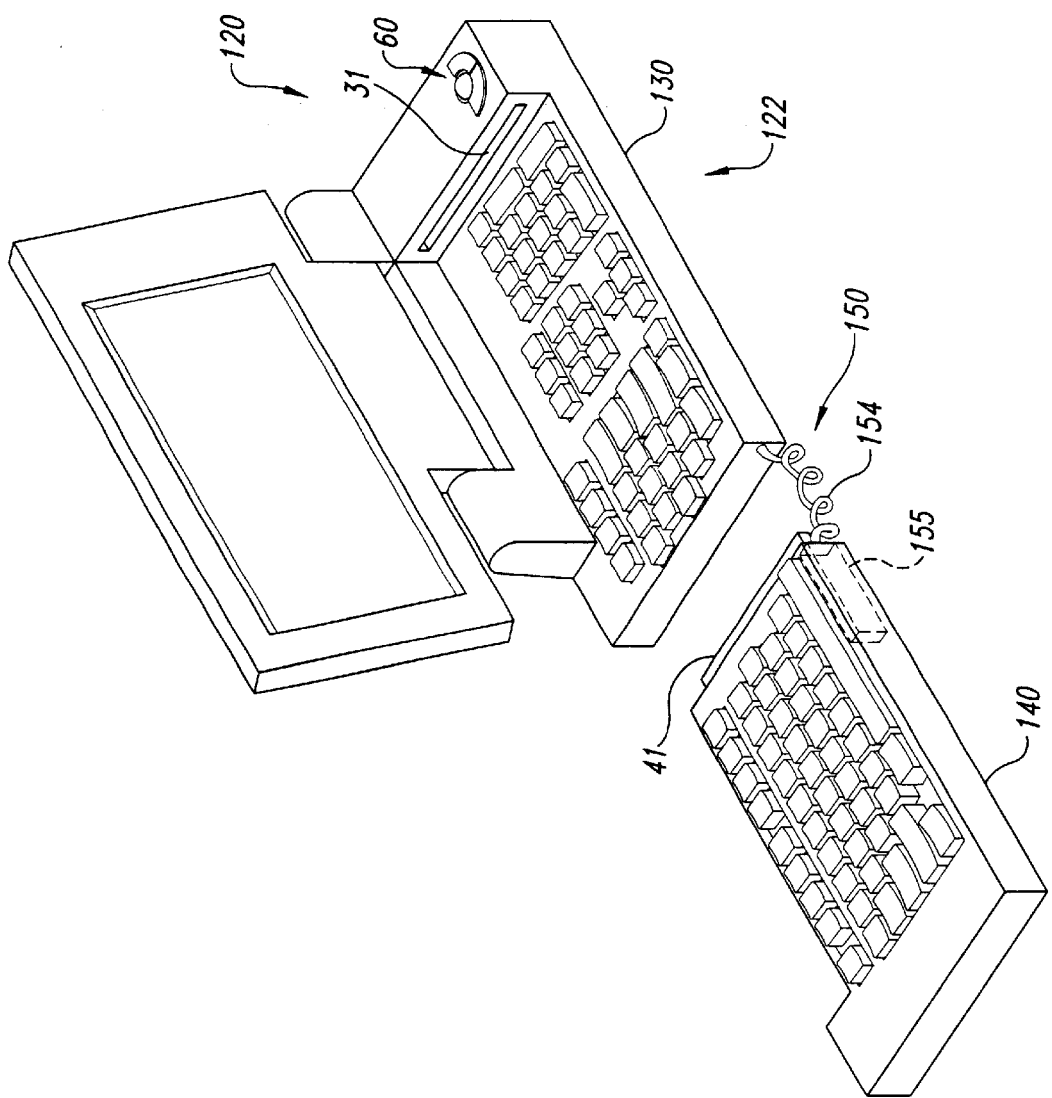
FIG. 3A is a top isometric view of a hand-held computer having a keyboard with an upper portion coupled by a cable to a base portion in accordance with another embodiment of the invention.

FIG. 3A is a top isometric view of another embodiment of a hand-held computer 120 with a keyboard 122 having an upper portion 140 that is not rigidly connected to a base portion 130 in the unstacked configuration. The computer 120 may further include a communication link 150 that connects the upper portion 140 to the base portion 130 when the keyboard 122 is in the unstacked configuration. For example, the communication link 150 can include a cable 154 extending between the upper portion 140 and the base portion 130 to allow the upper portion 140 to be moved to a variety of positions relative to the base portion 130. When the upper portion is moved to the stacked configuration (FIG. 1), the cable 154 may be disconnected from the base portion 130 and stored in a cable slot 155 located in the upper portion 140.

Figure 3B:
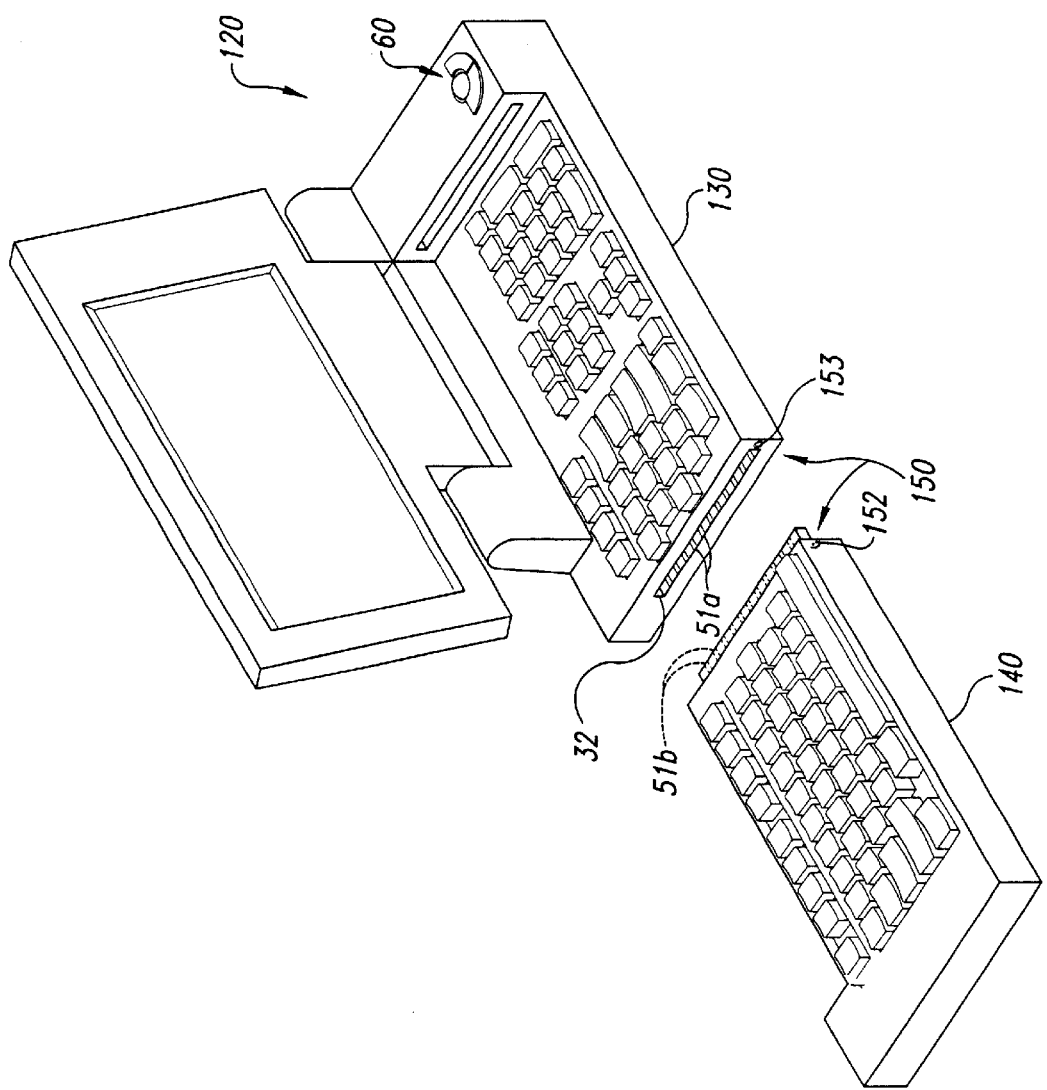
FIG. 3B is a top isometric view of a hand-held computer having a keyboard with an upper portion coupled by a wireless communication link to a base portion in accordance with still another embodiment of the invention.

FIG. 3B is a top isometric view of a hand-held computer 120 having a communication link 150 in accordance with another embodiment of the invention. The communication link 150 can include a transmitting transducer 152 located in the upper portion 140 and a receiving transducer 153 located in the base portion 130. Accordingly, signals may be transmitted from the upper portion 140 to the base portion 130 without the need for a cable 154 (FIG. 3A). Alternatively, the base portion 130 may include a transmitting transducer and the upper portion 140 may include a receiving transducer 153 to allow for two-way communication between the upper and lower portions. In one embodiment, the transmitting transducer 152 and the receiving transducer 153 may transmit and receive, respectively, infrared signals. In another embodiment, the transmitting transducer 152 and the receiving transducer 153 may transmit and receive, respectively, radio signals. In either embodiment, the upper portion 140 may be moved through a range of positions relative to the base portion 130 without interrupting communication between the two portions. Alternatively, users may attach the upper portion 140 to the second attachment site 32 of the base portion 130 in a manner similar to that discussed above with reference to FIGS. 1 and 2. When the upper portion 140 is attached to the second attachment site 32 of the base portion 130, signals may be transmitted between the upper and base portions 130 and 140 via the transducers 152, 153 and/or the electrical contacts 51a, b.

An advantage of the hand-held computer 120 shown in FIGS. 3A and 3B is that the keyboard 122 may be more comfortable to use. For example, users may separate the upper portion 140 from the base portion 130 by a distance that is limited only by the range of the communication link 150. By separating the keyboard portions, the base and upper portions 130 and 140 can be arranged in virtually any configuration to be more comfortable and ergonomic than conventional computer keyboards. A further advantage is that a single keyboard 122 may be used by a variety of users, each of whom may prefer a different arrangement of the keyboard portions, or by a single user under a variety of circumstances. For example, the upper portion 140 of the keyboard may be attached to the second attachment site 32 of the base portion 130 by users who prefer to have the keyboard portions fixed relative to each other, and can be separated by other users who may prefer to move the keyboard portions relative to each other.

Figure 4:
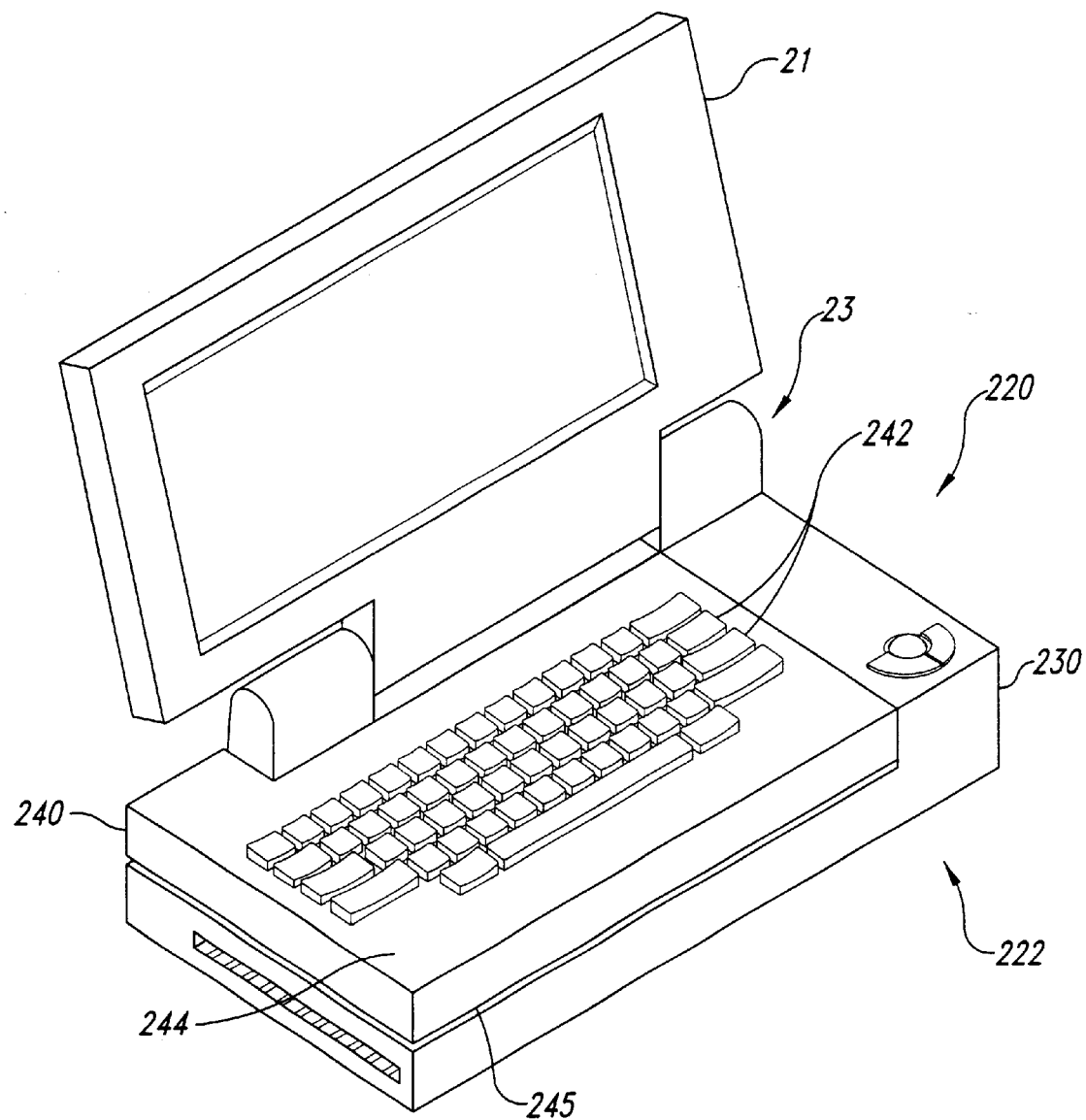
FIG. 4 is a top isometric view of a hand-held computer having a keyboard with a reversible upper portion positioned on a base portion in accordance with yet another embodiment of the invention.

FIG. 4 is a top isometric view of still another embodiment of a hand-held computer 220 having a keyboard 222 with a reversible upper portion 240. The upper portion 240 can have a top surface 244 and a bottom surface 245 opposite the top surface 244. When the upper portion 240 is attached to a base portion 230 in the stacked configuration (shown in FIG. 4), the bottom surface 245 faces the base portion 230 and the top surface 244 faces upward to expose top input keys 242 positioned in the top surface 244. The top input keys 242 may be smaller and more closely spaced than the input keys 33 and 43 shown in FIG. 1 to have both the right-hand and left-hand input keys of a QWERTY configuration within the confines of the upper portion 240 alone. For example, the top input keys 242 may be similar in size, construction, and operation to the keys of a conventional hand-held calculator. Accordingly, the user may have access to a complete QWERTY keyboard configuration upon pivoting the display 21 away from the keyboard 222 to the unstowed configuration.

Figure 5:
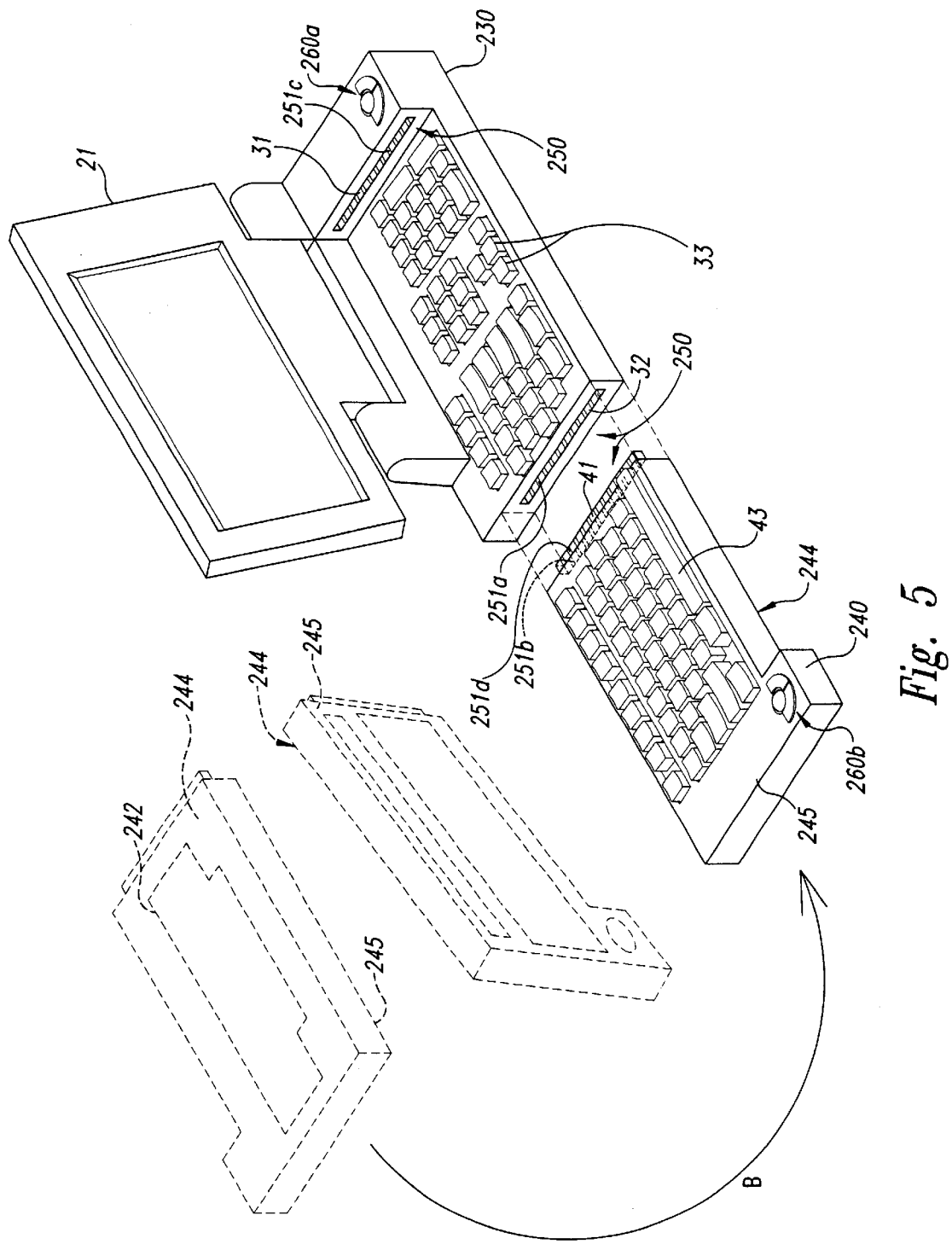
FIG. 5 is a top isometric view of the hand-held computer of FIG. 4 showing the inversion of the reversible upper portion.

FIG. 5 is a top isometric view of the hand-held computer 220 of FIG. 4 showing, in broken lines, the inversion of the reversible upper portion 240. The upper portion 240 can be removed from the first attachment site 31 and rotated 180° (arrow B) such that the top surface 244 faces downward and the bottom surface 245 faces upward to expose a full-size set of the left input keys 43. In one embodiment, the upper portion 240 can then be attached to the second attachment site 32 of the base portion 230, in a manner similar to that discussed above with reference to FIGS. 1 and 2. Accordingly, a communication link 250 between the upper portion 240 and the base portion 230 can include electrical contacts 251a at the second attachment site 32 to engage corresponding contacts 251b on the tab 41 for electrically coupling the left input keys 43 to the base portion 230. The communication link 250 can also include electrical contacts 251c at the first attachment site 31 that engage corresponding electrical contacts 251d on the tab 41 for coupling the top input keys 242 to the base portion 230 when the upper portion 240 is attached to the first attachment site 31. In another embodiment, the upper portion 240 can remain separated from the base portion 230 in the unstacked configuration and the communication link can include wireless transducers or a cable, as discussed above with reference to FIGS. 3A–3B.

As shown in FIG. 5, the computer 220 may include a pair of pointing devices 260 (shown in FIG. 5 as 260a and 260b). Both pointing devices 260 are accessible when the keyboard 222 is in the unstacked configuration, but only the pointing devices 260a on the base portion 230 is accessible when the keyboard 222 is in the stacked configuration. In another aspect of this embodiment, one or both of the pointing devices 260 may be removably attached to the keyboard 222 and may be operatively coupled to the keyboard with communication links (similar to those shown in FIGS. 3A and 3B) when detached from the keyboard.

An advantage of the hand-held computer 220 shown in FIGS. 4–5 is that a single computer may be suitable for a variety of users and/or a single user who uses the computer in a variety of environments. For example, when the computer 220 is used in a relatively cramped environment, the user may have immediate access to a small set of input keys 242 in the full QWERTY keyboard configuration upon moving the display 21 to the unstowed position and while the keyboard remains in the stacked configuration. When space permits, the user may connect the upper portion 240 to the second attachment site 32 of the base portion 230 to access a full-size keyboard with input keys 33 and 43 that are spaced in the manner of a conventional desktop computer keyboard.

Figure 6:
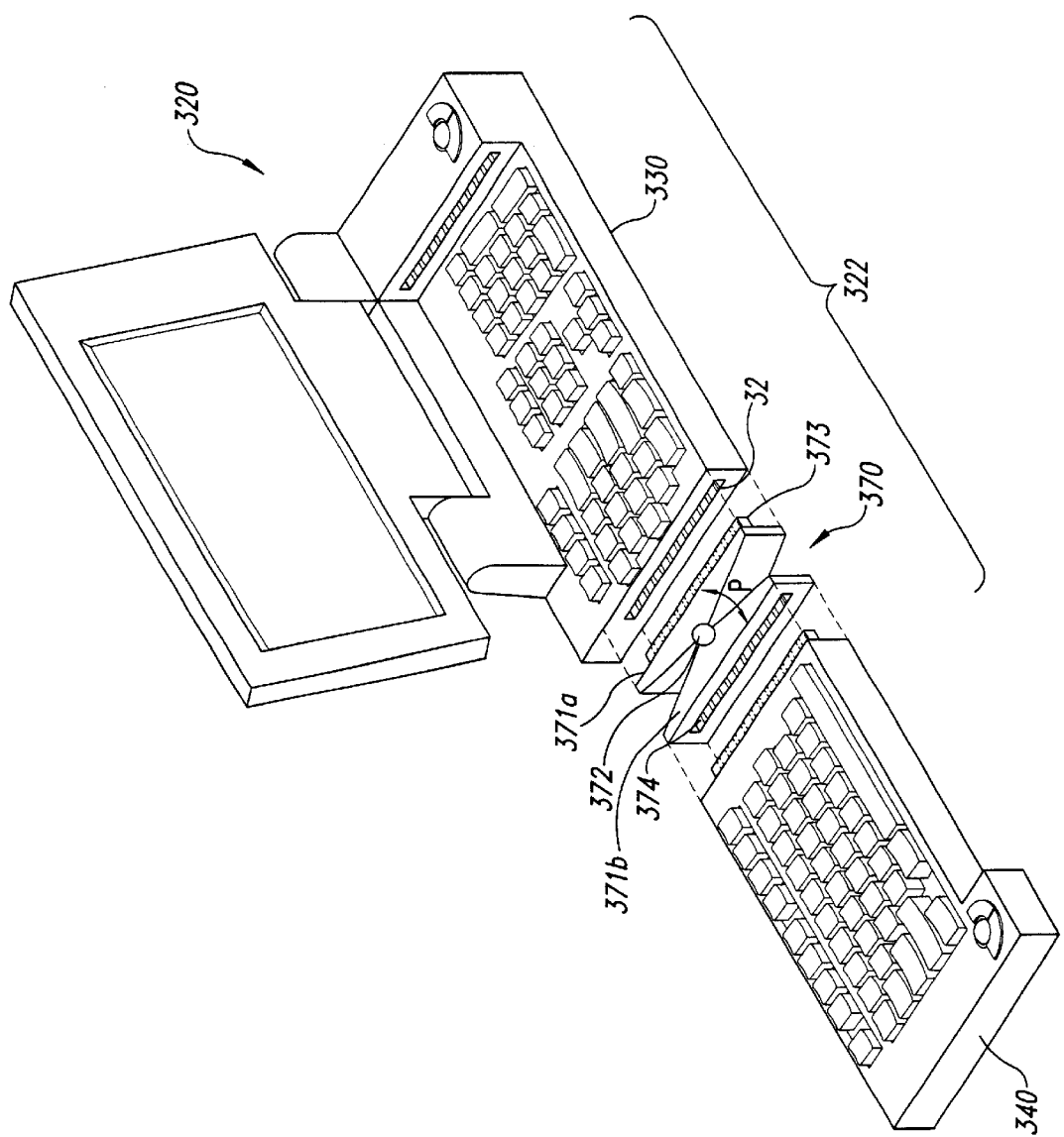
FIG. 6 is a partially exploded top isometric view of a hand-held computer having a keyboard with a reversible upper portion pivotally coupled to a base portion with a removable pivot member in accordance with another embodiment of the invention.

FIG. 6 is an exploded top isometric view of a hand-held computer 320 having a keyboard 322 with a reversible upper portion 340 pivotally coupled to the base portion 330 via a removable pivot member 370 in accordance with yet another embodiment of the invention. As shown in FIG. 6, the pivot member 370 can include two hinge leaves 371 (shown as 371a and 371b) coupled by a hinge pin 372. The hinge pin 372 extends along an axis that is generally perpendicular to the plane of the keyboard 322 such that the hinge leaves 371 can pivot relative to each other within the plane of the keyboard (arrow P). One of the hinges 371a may include a hinge tab 373 that is received by the second attachment site 32 of the base portion 330. The other hinge 371b can include a hinge aperture 374 that receives the tab 41 of the upper portion 340 when the upper portion is in the unstacked configuration.

In operation, users can attach the upper portion 340 to the base portion 330 by attaching the hinge tab 373 to the second attachment site 32 of the base portion 330 and by attaching the tab 41 of the upper portion 340 to the hinge aperture 374 of the pivot member 370. Users can then pivot the upper portion 340 about the hinge pin 372. Alternatively, if the users do not wish to pivot the upper portion 340 relative to the base portion 330, the users can connect the upper portion directly to the base portion without inserting the pivot member 370 between the two keyboard portions. In either case, the upper portion 340 can be inverted and connected to the first attachment site 31 in a stacked configuration, substantially as discussed above with reference to FIG. 4.

An advantage of the computer 320 shown in FIG. 6 is that it may be more comfortable to use than some conventional hand-held computers. For example, users can pivot the upper portion 340 to any of a variety of positions that may be more comfortable than the single position available with conventional fixed keyboards. A further advantage is that the computer 320 may be more versatile than conventional hand-held computers. For example, users can pivot the upper portion 340 relative to the base portion 330 by inserting the pivot member 370 between the two portions. On the other hand, users can attach the upper portion 340 directly to the base portion 330 without the pivot member 370 for having a rigid, straight keyboard.

Figure 7:
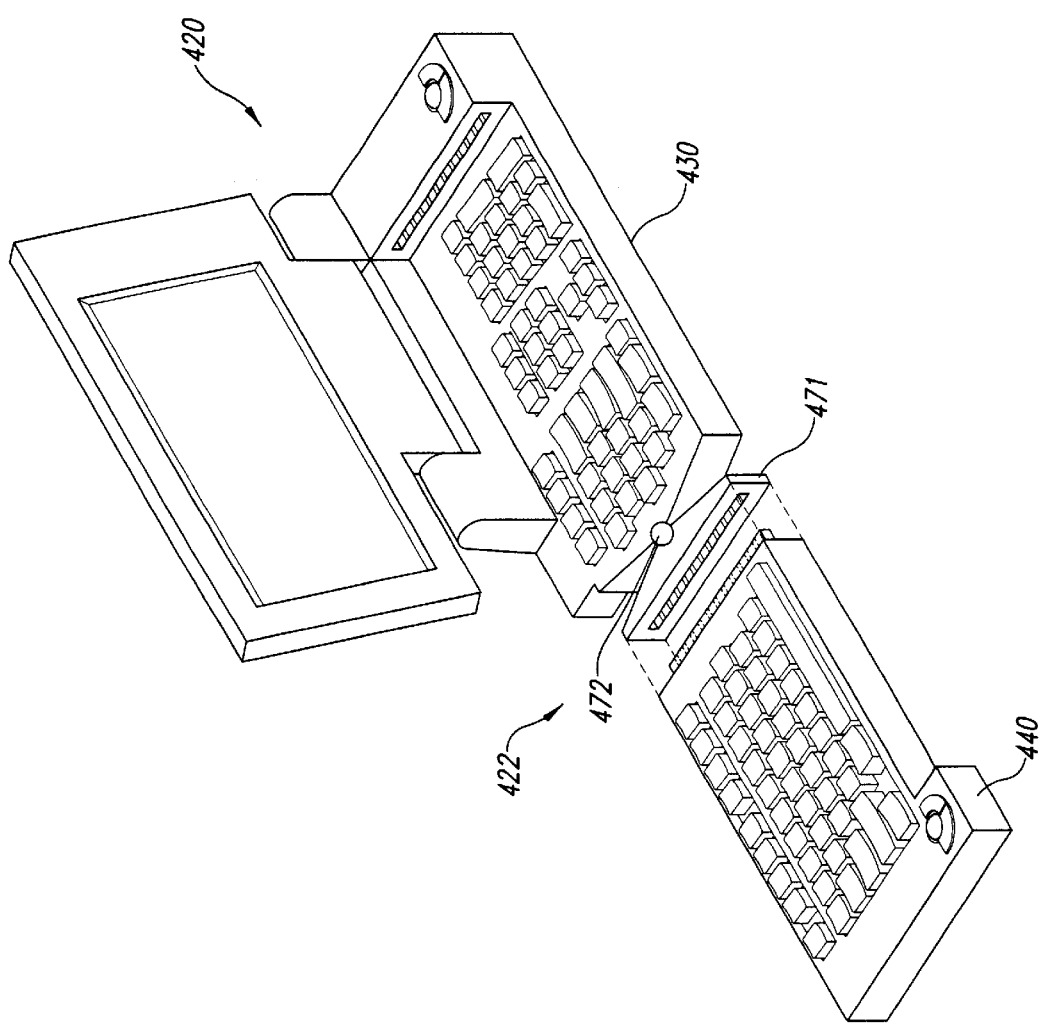
FIG. 7 is a top isometric view of a hand-held computer having a keyboard with a reversible upper portion that can be pivotally coupled to a base portion in accordance with still another embodiment of the invention.

FIG. 7 is an exploded top isometric view of a computer 420 having a keyboard 422 with a reversible upper portion 440 that can be pivotably coupled directly to a base portion 430 in accordance with another embodiment of the invention. Accordingly, the keyboard 422 can include a hinge pin 472 that pivotably couples a hinge 471 directly to the base portion 430. The upper portion 440 can be coupled to the hinge 471 in the manner discussed above with reference to FIG. 6. The computer 420 shown in FIG. 7 may be easier to use than the computer 320 shown in FIG. 6 because, unlike the pivot member 370 that must be separately coupled to the base portion 330. The hinge 471 is permanently coupled to the base portion 430. Conversely, the computer 320 may be more versatile because the pivot member 370 can be inserted between the two keyboard portions for pivoting the keyboard positions relative to each other, or the base portion 330 can be directly connected to the upper portion 340 for fixedly connecting the keyboard portions 330 and 340 together.

Figure 8:
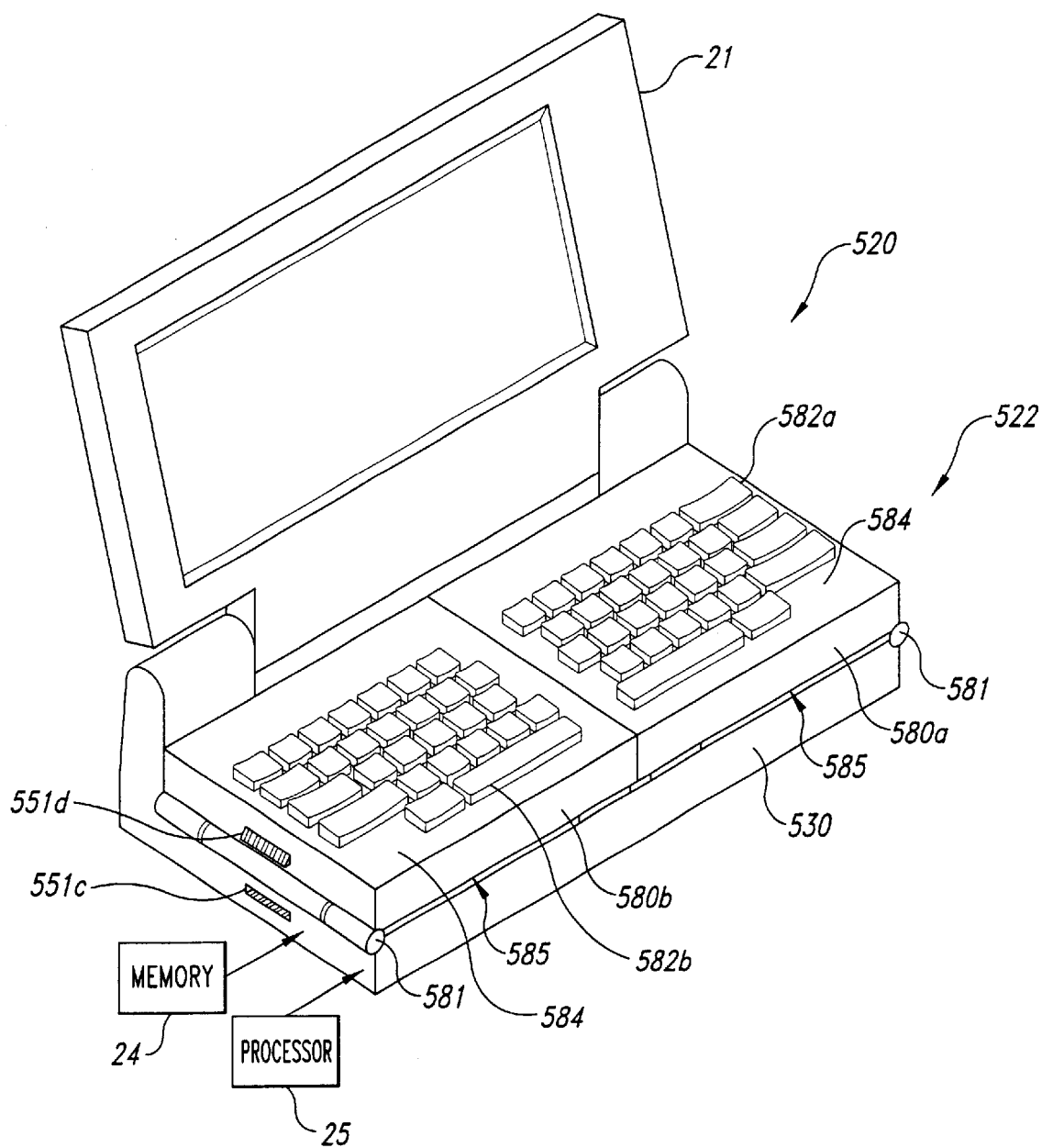
FIG. 8 is a top isometric view of a hand-held computer having a keyboard that includes two flap portions pivotally attached to a base portion and folded over the base portion in a folded configuration in accordance with yet another embodiment of the invention.

FIG. 8 is a top isometric view of another embodiment of a hand-held computer 520 having a keyboard 522 that includes two flap portions 580 (shown as 580a and 580b) coupled to a base portion 530. Each flap portion 580 can be pivotally attached to one end of the base portion 530 with a hinge 581. The combined width of the flap portions 580 is generally not greater than a width of the base portion 530. Accordingly, the flap portions 580 may be concurrently folded over the base portion 530 in a folded configuration (shown in FIG. 8) without overlapping each other. The flap portions 580 may be folded away from the base portion 530 in an unfolded configuration, as described in greater detail below with reference to FIG. 9.

As shown in FIG. 8, each flap portion 580 has a top surface 584 that faces upwardly when the flap portion is in the folded configuration and a bottom surface 585 that faces downwardly when the flap portion is in the folded configuration. The top surfaces 584 may include top input keys 582

(shown as 582*a* and 582*b*) that together form a QWERTY keyboard configuration. The top input keys 582 can be relatively small and spaced closely together so as to fit an entire QWERTY keyboard configuration within the confines of the two flap portions 580 in the folded configuration.

Figure 9:
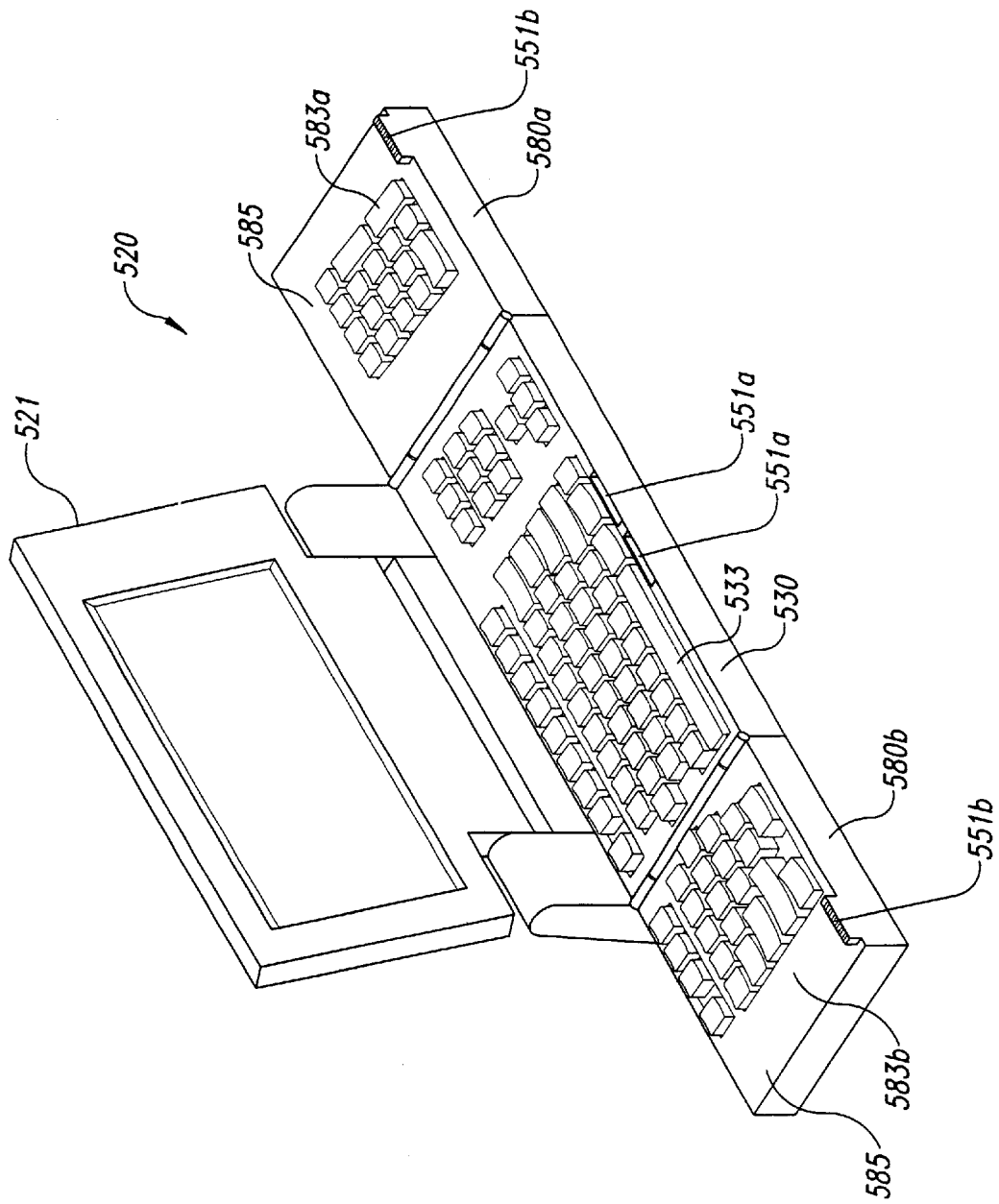
FIG. 9 is a top isometric view of the hand-held computer of FIG. 8, with the flap portions in an unfolded configuration.

FIG. 9 is a top isometric view of the hand-held computer 520 shown in FIG. 8 in the unfolded configuration in which the flap portions 580 are folded away from the base portion 530. In the unfolded configuration, the bottom surfaces 585 of the flap portions 580 face upward to expose bottom input keys 583 (shown as 583*a* and 583*b*). The bottom input keys 583, combined with base input keys 533 of the base portion 530 define a full-size QWERTY keyboard configuration. Accordingly, the base input keys 533 and the top input keys 583 may be sized and spaced in a manner generally similar to that of a conventional desktop computer keyboard with number and function keys.

The top input keys 582 and the bottom input keys 583 may be operatively coupled to the base portion 530 by one or more of several means. For example, the top and bottom input keys 582 and 583 may be operatively coupled to the base portion 530 with ribbon cables or electrical contacts (not shown) in the hinges between the flap portions 580 and the base portion 530. Alternatively, the flap portions 580 may have one set of electrical contacts 551*b* coupled to the top input keys 582 that engage corresponding electrical contacts 551*a* of the base portion 530 when the flap portions 580 are in the folded configuration. The flap portions 580 may have a second set of electrical contacts 551*d* (FIG. 8) coupled to the bottom input keys 583 that engage corresponding electrical contacts 551*c* (FIG. 8) of the base portion 530 when the flap portions 580 are in the unfolded configuration. Other embodiments can include other electrical connection devices that couple the input keys 582 and 583 to the base 530.

An advantage of the keyboard 520 shown in FIGS. 8 and 9 is that users may immediately access a reduced-sized QWERTY keyboard configuration upon pivoting the display 521 away from the keyboard 522 (FIG. 8). Users may also access a full-sized QWERTY keyboard configuration by simply moving the flap portions 580 to the unfolded configuration (FIG. 9). For example, users may operate the computer 520 in cramped environments by positioning the flap portions 580 in the folded configuration and may operate the computer in more spacious environments by positioning the flap portions in the unfolded configuration.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A keyboard for a hand-held computer, comprising:
   a first portion having a first plurality of input keys; and
   a second portion having a second plurality of input keys, the second portion being movable relative to the first portion between a first position and a second position, the second portion being removably attached to the first portion at least proximate to the first plurality of input keys to generally block access to the first plurality of input keys when the second portion is in the first position, and the second portion being at least proximate to the first portion with the first and second pluralities of input keys generally accessible when the second portion is in the second position, the second portion being movable to a third position between the first and second positions in which the second portion is separated from the first portion.

2. The keyboard of claim 1 wherein the first and second portions are configured to be supported by a single human hand when the second portion is in the first position.

3. The keyboard of claim 1 wherein when the second portion is in the second position the second portion is spaced apart from the first portion.

4. The keyboard of claim 1 wherein the second portion is removably attached to the first portion with the first and second pluralities of input keys facing generally upward when the second portion is in the second position.

5. The keyboard of claim 4 wherein the first portion has a first lower surface with a width configured to engage a first leg of a user and support the first portion, the second portion having a second lower surface with a width configured to engage a second leg of the user and support the second portion when the second portion is in the second position.

6. The keyboard of claim 1 wherein the first portion has an upper surface that defines a first plane and the second portion has a top surface that defines a second plane, the second plane being generally parallel to the first plane when the second portion is in the second position, the second portion being pivotably coupled to the first portion and pivotable relative to the first portion about an axis that is generally perpendicular to the second plane when the second portion is in the second position.

7. The keyboard of claim 1 wherein the second portion has a top surface and a bottom surface opposite the top surface, the second input keys being positioned proximate to the bottom surface of the second portion, the second portion further having third input keys proximate to the top surface, further wherein the bottom surface and the second input keys face the first input keys of the first portion when the second portion is in the first position, and the bottom surface and the second input keys face generally upward when the second portion is in the second position.

8. The keyboard of claim 7 wherein the first and second input keys are a first size and together include a standard QWERTY input key configuration and the third input keys are a second size that is smaller than the first size.

9. The keyboard of claim 1 wherein the first and second input keys are a first size and together include a standard QWERTY input key configuration.

10. The keyboard of claim 1 wherein one of the first and second portions of the keyboard includes a pointing device to manipulate images on a display of the hand-held computer.

11. The keyboard of claim 10 wherein the pointing device includes a roller ball rotatable relative to the one of the first and second keyboard portions.

12. The keyboard of claim 10 wherein the pointing device is accessible when the second portion is in the first position.

13. The keyboard of claim 10 wherein the pointing device is inaccessible when the second portion is in the first position and the pointing device is accessible when the second portion is in the second position.

14. The keyboard of claim 1, further comprising a communication link coupled between the first and second portions.

15. The keyboard of claim 14 wherein the communication link includes a first connector attached to the first portion and a second connector attached to the second portion, the first and second connectors being configured to be coupled together when the second portion is in the second position.

16. The keyboard of claim 14 wherein the communication link includes a cable connected between the first and second portions.

17. The keyboard of claim 14 wherein the communication link includes a wireless transmitting transducer coupled to at least one of the first and second portions and a wireless receiving transducer coupled to the other of the first and second portions.

18. The keyboard of claim 17 wherein the transmitting transducer includes a radio transmitting transducer and the receiving transducer includes a radio receiving transducer.

19. The keyboard of claim 17 wherein the transmitting transducer includes an infrared transmitting transducer and the receiving transducer includes an infrared receiving transducer.

20. The keyboard of claim 1, further comprising a display pivotably attached to the first portion and movable relative to the first portion between a stowed position and an unstowed position, the display being accessible to a user and facing at least partially away from the first portion when the display is in the unstowed position, the display being folded toward the first portion for transport when the display is in the stowed position.

21. A computer keyboard, comprising:
a first portion having a first plurality of input keys;
a second portion having a second plurality of input keys, the second portion being movable relative to the first portion between a stacked position and an unstacked position, the second portion being removably attached to a first attachment location of the first portion to be above the first plurality of keys and generally block access to the first plurality of keys when the second portion is in the stacked position, and the second portion being removably attached to a second attachment location of the first portion with the first and second pluralities of input keys generally accessible when the second portion is in the unstacked position, the second portion being movable to an intermediate position between the stacked position and the unstacked position in which the second portion is separated from the first portion; and
a signal communication link operatively coupling the first and second portions together in at least the unstacked position.

22. The keyboard of claim 21 wherein the first portion of the keyboard has an upper surface, a lower surface opposite the upper surface, and a first side surface between the upper and lower surfaces, the second attachment location being at the first side surface of the first portion.

23. The keyboard of claim 21 wherein the second portion has a second side surface and includes a tab projecting away from the second side surface, further wherein the second attachment location includes an aperture configured to removably receive the tab.

24. The keyboard of claim 23 wherein the communication link includes first electrical contacts on the tab and second electrical contacts in the aperture, the second electrical contacts being configured to engage the first electrical contacts when the second portion is attached to the first portion in the second position.

25. The keyboard of claim 21 wherein the first portion has an upper surface and a lower surface opposite the upper surface and the second portion has a top surface and a bottom surface opposite the top surface, the second plurality of input keys being at least proximate to the bottom surface, the second portion further having a third plurality of input keys at least proximate to the top surface, the bottom surface of the second portion and the second plurality of input keys facing upward and generally parallel with the upper surface of the first portion when the second portion is in the unstacked position, the top surface of the second portion and the third plurality of keys facing upward when the second portion is in the stacked position.

26. The keyboard of claim 21 wherein the first portion has an upper surface and a lower surface opposite the upper surface and the second portion has a top surface and a bottom surface opposite the top surface, the second plurality of input keys being at least proximate to the bottom surface, the bottom surface of the second portion and the second plurality of input keys facing upward and generally parallel with the upper surface of the first portion when the second portion is in the unstacked position, the top surface of the second portion facing upward when the second portion is in the stacked position.

27. The keyboard of claim 21 wherein the first and second portions are sized and configured to be supported by a single human hand when the second portion is in the stacked position.

28. The keyboard of claim 21 wherein the first portion has an upper surface that defines a first plane and the second portion has a top surface that defines a second plane, the second plane being generally parallel to the first plane when the second portion is in the unstacked position, the second portion being pivotably coupled to the first portion and pivotable relative to the first portion about an axis that is generally perpendicular to the second plane when the second portion is in the unstacked position.

29. The keyboard of claim 21 wherein the first portion of the keyboard has a pointing device for manipulating images on a display of the hand-held computer.

30. A keyboard for a hand-held computer, comprising:
a base portion having a lower surface, an upper surface opposite the lower surface, a rear surface between the upper and lower surfaces, a forward surface between the upper and lower surfaces opposite the rear surface, and a side surface between the upper and lower surfaces and between the forward and rear surfaces, the base portion further having a first plurality of input keys proximate to the upper surface, the base portion still further having first and second attachment ports, the first attachment port being in a recess of the upper surface, the second attachment port being in the side surface;
an upper portion having a top surface, a bottom surface opposite the top surface, a side surface between the top and bottom surfaces, a tab projecting away from the side surface of the upper portion, a second plurality of input keys proximate to the top surface, and a third plurality of input keys proximate to the bottom surface, the upper portion being movable relative to the base portion between a stacked position and an unstacked position, the tab being removably received in the first attachment port of the base portion with the top surface of the upper portion being above the upper surface of the base portion to block access to the first plurality of input keys and expose the second plurality of input keys when the upper portion is in the stacked position, and the tab being removably received in the second attachment port of the base portion with the first and third pluralities of input keys facing upward and accessible when the upper portion is in the unstacked position; and
a communication link operatively coupling the base and upper portions together when the upper portion is in at least the unstacked position.

31. The keyboard of claim 30 wherein the communication link includes first electrical contacts in the first attachment port and corresponding second electrical contacts on the tab of upper portion coupled to the second input keys, the first and second electrical contacts being configured to couple with each other when the upper portion is in the stacked position.

32. The keyboard of claim 31 wherein the communication link includes third electrical contacts in the second attachment port and fourth electrical contacts on the tab of the upper portion coupled to the third input keys and configured to couple with the third electrical contacts when the tab is received in the second attachment port.

33. The keyboard of claim 32 wherein the first and third input keys are a first size and together include a standard QWERTY input key configuration and the second input keys are a second size that is smaller than the first size.

34. The keyboard of claim 30 wherein the upper surface of the base portion is generally co-planer with the top surface of the upper portion when the upper portion is in the unstacked position, the upper portion being pivotably coupled to the base portion and pivotable relative to the base portion about an axis that is generally perpendicular to the top surface of the upper portion when the upper portion is in the unstacked position.

35. A hand-held computer, comprising:
 a first keyboard portion having a first plurality of input keys;
 a second keyboard portion having a second plurality of input keys and being movable relative to the first keyboard portion between a first position and a second position, the second keyboard portion being removably attached to the first keyboard portion to block access to the first plurality of input keys when the second keyboard portion is in the first position, the second keyboard portion being removably attached to the first keyboard portion to allow access to the first plurality of input keys when the second keyboard portion is in the second position, the second keyboard portion being movable to a third position between the first and second positions in which the second portion is separated from the first keyboard portion;
 a display portion pivotably attached to at least one of the first or second keyboard portions and movable relative to the first keyboard portion between a stowed position and an unstowed position, the display portion being accessible in the unstowed position;
 a processor device and a memory device coupled to at least one of the first keyboard portion, the second keyboard portion, or the display;
 a pointing device coupled to at least one of the first and second keyboard portions; and
 a signal communication link operatively coupling between the first and second keyboard portions together when the second keyboard portion is in at least the second position.

36. The computer of claim 35 wherein the first keyboard portion has an upper surface that defines a first plane and the second keyboard position has a top surface that defines a second plane, the second plane being generally parallel to the first plane when the second keyboard portion is in the second position, the second keyboard portion being pivotably coupled to the first keyboard portion and pivotable, relative to the first keyboard portion about an axis that is generally perpendicular to the second plane when the second keyboard portion is in the second position.

37. The keyboard of claim 36 wherein the second keyboard portion has a top surface and a bottom surface opposite the top surface, the second plurality of input keys being positioned proximate to the top surface, the second keyboard portion further having a third plurality of input keys proximate to the bottom surface, the top surface of the second keyboard portion and the second input keys facing generally upward when the second keyboard portion is in the first position, the bottom surface and the third input keys facing the first input keys of the first keyboard portion when the second keyboard portion is in the first position.

38. The keyboard of claim 35 wherein the communication link includes a first connector attached to the first keyboard portion and a second connector attached to the second keyboard portion, the first and second connectors being configured to be coupled together when the second keyboard portion is in the second position.

39. A keyboard for a hand-held computer, comprising:
 a first keyboard portion having an upper surface and a first plurality of input keys accessible through a first aperture in the upper surface;
 a second keyboard portion having a top surface and a second plurality of input keys proximate to the top surface, the second keyboard portion being movable relative to the first keyboard portion between a first attached position, a second attached position, and a detached position between the first and second positions, the second keyboard portion being separated from the first keyboard portion when the second keyboard portion is in the detached position, the second keyboard portion being removably attached to the first keyboard portion and blocking access to the first input keys when the second keyboard portion is in the first position, and the second keyboard portion being pivotably coupled to the first keyboard portion and pivotable relative to the first keyboard portion about a pivot axis generally perpendicular to the upper surface of the first keyboard portion when the second keyboard portion is in the second position with the first input keys accessible;
 a communication link operatively coupling the first and second keyboard portions together when the second keyboard portion is in at least the second position.

40. The keyboard of claim 39 wherein the communication link includes a first connector attached to the first keyboard portion and a second connector attached to the second keyboard portion, the first and second connectors being configured to be coupled together when the second keyboard portion is in the second position.

41. The keyboard of claim 39 wherein the first and second pluralities of input keys together include a standard QWERTY input key configuration.

42. The keyboard of claim 39 wherein the second keyboard portion has a bottom surface opposite the top surface and a third plurality of keys proximate to the bottom surface, the first and third pluralities of input keys together including a standard QWERTY input key configuration.

43. The keyboard of claim 42 wherein the second input keys are smaller than the third input keys.

44. The keyboard of claim 39 wherein the first portion of the keyboard has a pointing device.

45. The keyboard of claim 39 wherein the top surface of the second keyboard portion is generally parallel to the upper surface of the first keyboard portion when the second keyboard portion is in the second position.

46. The keyboard of claim 39 wherein the first keyboard portion includes a pivot member having a first hinge portion pivotably coupled to a second hinge portion and pivotable about the pivot axis relative to the first hinge portion, the first hinge portion being removably attached to the first keyboard portion, the second hinge portion being removably attached to the second keyboard portion when the second keyboard portion is in the second position.

47. The keyboard of claim 39 wherein the keyboard includes a hinge pivotably attached to the first keyboard portion and pivotable relative to the first keyboard portion about the pivot axis, the second keyboard portion being removably attached to the hinge when the second keyboard portion is in the second position.

48. A hand-held computer, comprising:
a base keyboard portion having an upper surface, a lower surface opposite the upper surface, a first edge between the upper and lower surfaces, a second edge between the upper and lower surfaces opposite the first edge, and base input keys at least proximate to the upper surface;
a display pivotally coupled to the base keyboard portion and movable relative to the base keyboard portion between a stowed position and an unstowed position, the display being accessible in the unstowed position; and
a first flap portion having a top surface, a bottom surface opposite the top surface, top input keys at least proximate to the top surface, and bottom input keys at least proximate to the bottom surface, the first flap portion being pivotably attached to the base keyboard portion proximate to the first edge of the base keyboard portion and being pivotable relative to the base keyboard portion between a folded position and an unfolded position, the bottom surface of the first flap portion facing the upper surface of the base keyboard portion to generally block access to at least some of the base input keys of the base keyboard portion and the bottom input keys of the first flap portion and to expose the top input keys of the first flap portion when the first flap portion is in the folded position, the bottom surface of the first flap portion and the upper surface of the base keyboard portion facing in approximately the same direction with the bottom input keys of the first flap portion and the base input keys of the base keyboard portion generally accessible when the first flap portion is in the unfolded position; and
a second flap portion having a top surface, a bottom surface opposite the top surface, top input keys at least proximate to the top surface of the second flap portion, and bottom input keys at least proximate to the bottom surface of the second flap portion, combined widths of the first and second flap portions being not greater than a width of the base keyboard portion, the second flap portion being pivotably attached to the base keyboard portion proximate to the second edge of the base keyboard portion and pivotable relative to the base keyboard portion between a folded position and an unfolded position, the second flap portion being configured to be moved to its folded position simultaneously with the first flap portion being moved to its folded position without overlapping the first and second flap portions, the bottom surface of the second flap portion facing the upper surface of the base keyboard portion to generally block access to at least some of the base input keys of the base keyboard portion and the bottom input keys of the second flap portion and to expose the top input keys of the second flap portion when the second flap portion is in its folded position, the bottom surface of the second flap portion and the upper surface of the base keyboard portion facing in approximately the same direction with the base input keys of the base keyboard portion and the top input keys of the second flap portion generally accessible when the second flap portion is in its unfolded position.

49. The computer of claim 48 wherein the bottom input keys of the first and second flap portions are larger than the top input keys of the first and second flap portions.

50. The computer of claim 49 wherein the bottom keys of the first and second flap portions together with the base keys of the base keyboard portion are arranged in a standard QWERTY input key configuration.

51. The computer of claim 49 wherein the top input keys of the first and second keyboard portions are arranged in a standard QWERTY input key configuration.

52. A computer keyboard, comprising:
a first portion having a first plurality of input keys;
a second portion having a second plurality of input keys, the second portion being movable relative to the first portion between a stacked position and an unstacked position, the second portion being removably attached to a first attachment location of the first portion to be above the first plurality of keys and generally block access to the first plurality of keys when the second portion is in the stacked position, and the second portion being removably attached to a second attachment location of the first portion with the first and second pluralities of input keys generally accessible when the second portion is in the unstacked position, the second portion having a second side surface and a tab projecting away from the second side surface, further wherein the second connection location includes an aperture configured to removably receive the tab; and
a communication link operatively coupling the first and second portions together in at least the unstacked position, the communication link including first electrical contacts on the tab and second electrical contacts in the aperture, the second electrical contacts being configured to engage the first electrical contacts when the second portion is attached to the first portion in the second position.

53. A keyboard for a hand-held computer, comprising:
a first portion having a first plurality of input keys; and
a second portion having a second plurality of input keys, the second portion being movable relative to the first portion between a first position and a second position, the second portion being removably and separably attached to the first portion at least proximate to the first plurality of input keys to generally block access to the first plurality of input keys when the second portion is in the first position, the second portion being at least proximate to the first portion with the first and second pluralities of input keys generally accessible when the second portion is in the second position, the second portion being movable to a third position between the first and second positions in which the second portion is separated from the first portion.

54. The keyboard of claim 39 wherein the communication link includes a pivot member having a first hinge portion pivotably coupled to a second hinge portion and pivotable about the pivot axis relative to the first hinge portion, the first hinge portion having first electrical contacts removably attached to the first keyboard portion, the second hinge portion having second electrical contacts removably attached to the second keyboard portion when the second keyboard portion is in the second position.

* * * * *

UNITED STATES PATENT AND TRADEMARK OFFICE
CERTIFICATE OF CORRECTION

PATENT NO. : 6,266,234 B1
DATED : July 24, 2001
INVENTOR(S) : Leman

It is certified that error appears in the above-identified patent and that said Letters Patent is hereby corrected as shown below:

Column 4,
Line 33, new paragraph should begin after "keys 33.";

Column 13,
Line 62, delete comma after "pivotable";

Signed and Sealed this

Fourth Day of June, 2002

*Attest:*

JAMES E. ROGAN
*Attesting Officer* *Director of the United States Patent and Trademark Office*